(12) United States Patent
Mannebach et al.

(10) Patent No.: US 8,969,501 B2
(45) Date of Patent: Mar. 3, 2015

(54) HIGH PRESSURE LDPE FOR MEDICAL APPLICATIONS

(75) Inventors: Gerd Mannebach, Münstermaifeld (DE); Catherine Beuzelin, Salon de Provence (FR); Christian-Ulrich Schmidt, Bonn (DE); Thomas Maurer, Brühl (DE); Jörn Müller, Köln (DE); Alexander Wörz, Grünstadt (DE); Mike Freudenstein, Kiedrich (DE)

(73) Assignee: Basell Polyolefine GmbH, Wesseling (DE)

( * ) Notice: Subject to any disclaimer, the term of this patent is extended or adjusted under 35 U.S.C. 154(b) by 259 days.

(21) Appl. No.: 13/504,446

(22) PCT Filed: Nov. 10, 2010

(86) PCT No.: PCT/EP2010/006829
§ 371 (c)(1),
(2), (4) Date: May 8, 2012

(87) PCT Pub. No.: WO2011/057764
PCT Pub. Date: May 19, 2011

(65) Prior Publication Data
US 2012/0220738 A1  Aug. 30, 2012

Related U.S. Application Data

(60) Provisional application No. 61/281,659, filed on Nov. 20, 2009.

(30) Foreign Application Priority Data

Nov. 10, 2009 (EP) .................................... 09014063

(51) Int. Cl.
| | | |
|---|---|---|
| *C08F 110/02* | (2006.01) | |
| *C08F 2/38* | (2006.01) | |
| *B29C 49/00* | (2006.01) | |
| *C08F 4/38* | (2006.01) | |
| *B29D 22/00* | (2006.01) | |
| *A61J 1/05* | (2006.01) | |

(52) U.S. Cl.
CPC . *C08F 110/02* (2013.01); *A61J 1/05* (2013.01)
USPC ............ 526/352.2; 526/64; 526/86; 526/208; 264/524

(58) Field of Classification Search
USPC .................... 526/64, 352.2, 86, 208; 264/524
See application file for complete search history.

(56) References Cited

U.S. PATENT DOCUMENTS

| | | | |
|---|---|---|---|
| 3,334,081 A | 8/1967 | Madgwick et al. | |
| 3,546,189 A * | 12/1970 | Ebster et al. ...................... | 526/64 |
| 3,714,135 A | 1/1973 | Pfannmueller et al. | |
| 4,382,132 A | 5/1983 | Kelley et al. | |
| 5,100,978 A | 3/1992 | Hasenbein et al. | |
| 5,872,252 A | 2/1999 | Sutoris et al. | |
| 6,117,465 A | 9/2000 | Falla | |
| 6,319,975 B1 | 11/2001 | Lee et al. | |
| 6,407,191 B1 | 6/2002 | Mezquita et al. | |
| 6,569,962 B1 | 5/2003 | Zschoch et al. | |
| 6,619,516 B2 * | 9/2003 | Weiler et al. .................. | 222/420 |
| 6,887,955 B2 | 5/2005 | Deckers et al. | |
| 7,737,229 B2 | 6/2010 | Gonioukh et al. | |
| 8,415,442 B2 | 4/2013 | Karjala et al. | |
| 2003/0181632 A1 * | 9/2003 | Mhling et al. ................. | 528/356 |
| 2009/0008354 A1 * | 1/2009 | Weiler et al. .................. | 215/247 |
| 2010/0113706 A1 * | 5/2010 | Crowther et al. ............. | 525/342 |

FOREIGN PATENT DOCUMENTS

| | | |
|---|---|---|
| CN | 1246099 A | 3/2000 |
| CN | 1281870 A | 1/2001 |
| CN | 101072800 A | 11/2007 |
| DE | 19622441 | 12/1997 |
| EP | 0928797 A1 | 7/1999 |
| EP | 2123707 | 11/2009 |
| GB | 1047851 A | 11/1966 |
| JP | 2000-202002 A | 7/2000 |
| JP | 2007-510023 A | 4/2007 |
| JP | 2008-104868 A | 5/2008 |
| JP | 2008-307146 A | 12/2008 |
| JP | 2012-505292 A | 3/2012 |
| WO | WO-01/60875 | 8/2001 |
| WO | WO-2005/065818 | 7/2005 |

OTHER PUBLICATIONS

ASTM D1238-10, Standard Test Method for Melt Flow Rates of Thermoplastics by Extrusion Plastometer, 1-15 (Mar. 2010).*
Peacock, Andrew J., Handbook of Polyethylene, Exxon Chemical Company, Baytown, Texas Marcel Dekker Inc., New York/Basel 2000, 7-10.
"Polyacryl-Verbindungen bis Quecksilber", Ullmans Encyklopadie der technischen Chemie, Verlag Chemie GmbH, Weinheim/Germany, Band 19, 1980, 169-178. Benoit, H. Rempp et al., "A Universal Calibration for Gel Permeation Chromatography", Journal of Polymer Sci., Phys. Ed. 5 1967, 753-759.
Cox et al., "Correlation of Dynamic and Steady Flow Viscosities", Journal of Polymer Science, vol. 28, Issue No. 118, 1958, 619.
LyondellBasell Polymers, Product Data and Technical Information, Purell, PE3420F, 2007.
J. Peacock, Handbook of Polyethylene, Marcel Dekker, Inc. 2000, pp. 43-53, 124-127, 170-175, 224-227.
S. Goto et al., Computer Model for Commercial High-Pressure Polyethylene Reactor Based on Elementary Reaction Rates Obtained Experimentally, Journal of Applied Polymer Science: Applied Polymer Symposium, 36, pp. 21-40, 1981.
James Stern, Addressing the Challenges Facing Today's Blow-Fill-Seal Industry, BFS IOA American Meeting 2009, Oct. 5-6, 2009, Hotel Sofitel Chicago Water Tower, Chicago, USA.
LyondellBasell's New Purell Resin Expands the Boundaries of LDPE Properties, Plastic Material News/2009/11, posted Nov. 6, 2009 at http://blog.ides.com/plastics news/2009/11/, 14 pages.
LyondellBasell's New Purell Resin Expands the Boundaries of LDPE Properties, posted at LyondellBasell's website on Nov. 6, 2009 at http://www.lyondellbasell.com/News/NewsReleases/ProdctsTechnology/, 2 pages.
Purell PE 3220 D LDPE product datasheet, Low Density Polyethylene, LyondellBasell Industries, Oct. 10, 2012, 1 page.
Lupolen 3220 F product datasheet, Low Density Polyethylene, LyondellBasell Industries, Jan. 18, 2012, 1 page.

\* cited by examiner

*Primary Examiner* — Fred M Teskin

(57) ABSTRACT

A novel LDPE from radical, high pressure polymerization is devised.

29 Claims, 4 Drawing Sheets

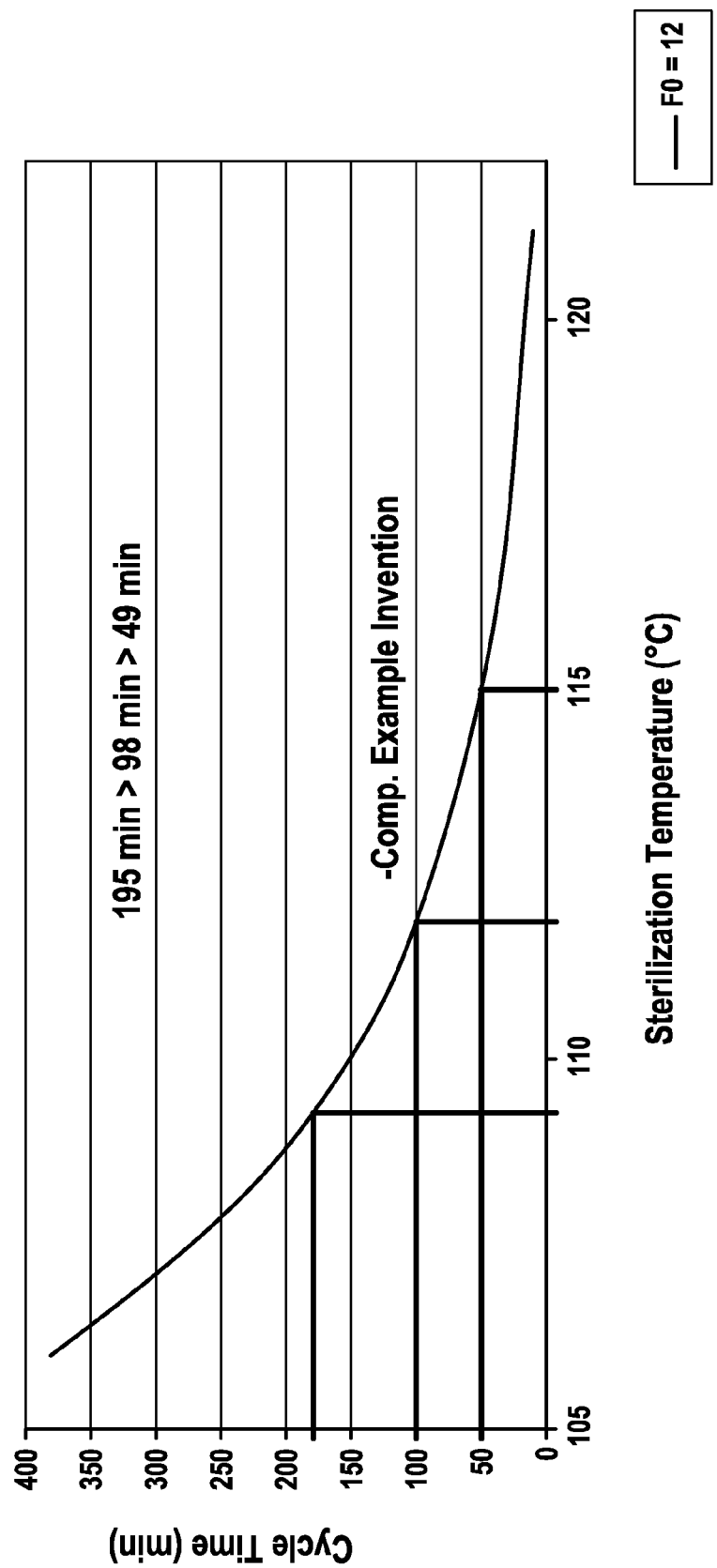

HIGH PRESSURE LDPE FOR MEDICAL APPLICATIONS

This application is the U.S. national phase of International Application PCT/EP2010/006829, filed Nov. 10, 2010, claiming priority to European Application 09014063.3 filed Nov. 10, 2009 and the benefit under 35 U.S.C. 119(e) of U.S. Provisional Application No. 61/281,659, filed Nov. 20, 2009; the disclosures of International Application PCT/EP2010/006829, European Application 09014063.3 and U.S. Provisional Application No. 61/281,659, each as filed, are incorporated herein by reference.

The present invention relates to the field of medical packing. It claims a novel, radically polymerized LDPE suitable for manufacturing sterilizable, sealable bottles and containers for e.g. liquids.

edical, sterile liquids for use in infusion or injection are usually bottled in plastic packages by a special process known as BFS: blow-fill-seal. An important characteristic of the Blow-Fill-Seal Process is the sterile and pyrogen-free moulding of the bottles or ampoules directly from the extruded PE or PP in water cooled blow moulds with an immediate sterile filling of product, followed by a hermetic sealing of the container in one step and, most importantly, under aseptic conditions in the same machine promptly, without delay. The technology is known for being neutral as to the nature of the filling product, finally. Such sealed bottles or ampoules made from flexible polymer need to be subsequently heat-sterilized still then, namely by subjection of the filled, sealed bottles for an extended period of at least 30 min. to a temperature of about 115-121° C. in saturated water steam in an autoclave vessel. In case of sensitive substances, lower temperature regimes apply, e.g. dextrose solutions comprised in most medical infusion recipes cannot withstand 121° C. and have to be sterilized at 115.5° C. for 30 min. But even this lower temperature threshold may not be achieved with the known PE materials, requiring even lower sterilization temperatures closer to 110° C. and consequently much longer sterilization times.

The temperature resistance/softening and melting temperatures of the LDPE material used is paramount to non-leakage of the bottle during sterilization, in view of internal pressure-build up at least during the initial heating phase of the sterilization process, and needs further improvement. PE materials are sought for that allow likewise of faster ramping up of the sterilization temperature and/or use of higher sterilization temperatures, for shortening sterilization process times in manufacturing, whilst preferably preserving excellent processability of the polymer for blow moulding concomitantly. It has not been feasible to devise such material by the prior art.

It is an object of the present invention to devise a new LDPE material and accordingly a new process for its manufacture, said new material allowing of faster heat sterilization and/or sterilization at higher temperature than the prior art materials, whilst preserving good processability in terms of a sufficiently high melt flow rate. This object has been solved by a new LDPE material having a higher density corresponding to a higher crystallinity and melting temperature, respectively, whilst surprisingly preserving the comparatively high melt flow rate of the prior art materials. This material has not been known before. Hitherto, its combination of properties could not have been realized by the known manufacturing processes, simply.

BRIEF DESCRIPTION OF THE SEVERAL VIEWS OF THE DRAWINGS

FIG. 4 illustrates cycle time versus sterilization temperature for an LDPE.

Figure 1:
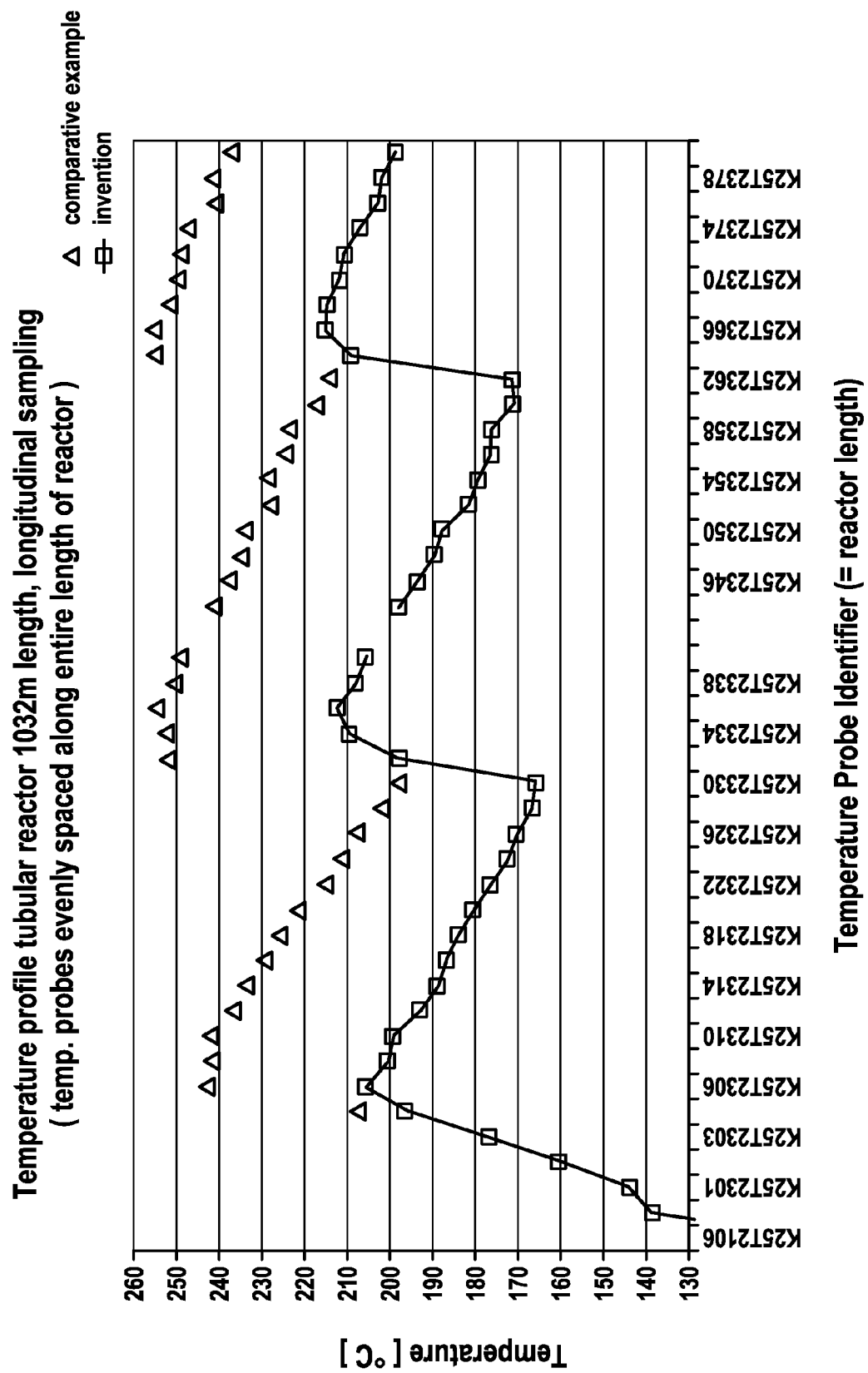
FIG. 1 illustrates a temperature profile for a tubular reactor.

According to the present invention, it is firstly devised a Low density polyethylene (LDPE) obtained by radical polymerisation of ethylene and wherein the LDPE is a homopolymer, which LDPE has a density of at least 0.932 g/cm$^3$ or above, preferably of at least 0.933 g/cm$^3$ or above, and which has a molecular weight distribution Mw/Mn of from 6 to 15, and has an MI (190° C./2.16 kg) of >0.45 g/10 min, preferably of >0.80 g/10 min, more preferably of >0.90 g/10 min.

According to the present invention, it is further or secondly devised a Low density polyethylene (LDPE), for use preferably in blow-fill-seal blow moulding, obtained by radical polymerisation of ethylene, which LDPE has a density of at least 0.932 g/cm$^3$ or above, preferably of at least 0.933 g/cm$^3$ or above, has a molecular weight distribution Mw/Mn of from 3 to 10, and has an MI (190° C./2.16 kg) of >0.45 g/10 min, preferably of >0.80 g/10 min, more preferably of >0.90 g/10 min.

Preferably, the melt flow rate or MI (190° C./2.16 kg) ranges, in combination with the above given lower limit for the same, up to 1.5 g/10 min., more preferably up to 1.25 g/10 min., most preferably up to 1.1 g/10 min.

The LDPE of the invention typically and preferably is a homopolymer. Preferably, the LDPE of the invention is encompassing carbonyl moieties or further, distinct alkyl residues due to a chain transfer agent having been used during radical polymerisation, which chain transfer agent is selected from the group consisting of C3 to C10 aldehyde or alkane, preferably a C3 to C15 alkane comprising a tertiary or secondary C—H group. More preferably, the chain transfer agent is a C3 to C6 aldehyde, most preferably is propanal.

Preferably, the density of the LDPE of the invention is of from 0.932 to 0.936 g/cm$^3$, more preferably of from 0.932 to 0.935 g/cm$^3$ and most preferably of from 0.933 to 0.934 g/cm$^3$. Aforesaid preferred density ranges apply in particular in combination with the above said, preferred ranges for the limits of the melt flow rate or MI (190° C./2.16 kg), in particular with achieving a melt flow rate of at least >0.80 g/10 min. and up to 1.25 g/10 min. Preferably, the LDPE has a melting temperature in DSC of >118° C. For details of measurement, please confer to the method description given in the experimental section. Typically, the LDPE of the present invention shows one peak in DSC. Said peak, defined as the 2$^{nd}$ heat of melting peak temperature (Tm2), is in a temperature range of from 118° C. to 122° C., preferably is accommodated in a range of from 119° C. to 120° C.

The molecular mass distribution of the LDPE of the invention is preferably, in the typical mode of working the invention, at least substantially monomodal, in terms of number of peaks corresponding to true curve optima, and preferably has afore said comparatively narrow polydispersity value of MWD ranging preferably up to 10.

Preferably, the LDPE has an Mw of from 60,000 to 130,000 g/mol, preferably of from 80,000 to 120,000 g/mol. It is important to note that the Mw is determined by GPC employing light scattering detection and quantification, responsive to the LCB contents of the present LDPE. The method is set forth in more detail in the experimental section.

Most preferably, the Vicat A temperature of the LDPE of the present invention ranges of from 109 to 112° C. —The softening or Vicat temperature is dependent on the melting temperature determined by DSC, and changes linearly therewith in the ranges relevant in the present context. Therefore the melting temperature itself is already indicative of a corresponding, lower Vicat temperature.

Preferably, the zero shear viscosity $\eta_0$ of the LDPE of the present invention is <9·10$^4$ Pas, more preferably is <7·10$^4$ Pas, wherein $\eta_0$ is the zero shear viscosity @190° C. determined via the empiric Cox-Merz-rule @190° C. from complex viscosity measurement. Complex viscosity $\eta^*$ @190° C. may be determined by dynamic (sinusoidal) shearing of a polymer sample in e.g. a double-plate rheometer such as such as Anton-Paar MCR 300 (Anton Paar GmbH, Graz/Austria) as described in full detail in the experimental section. According to the Cox-Merz-Rule, when the rotational speed $\omega$ is expressed in Radiant units, at low shear rates, the numerical value of $\eta^*$ is equal to that of conventional, intrinsic viscosity based on low shear capillary measurements. The skilled person in the field of rheology is well versed with determining zero shear viscosity in this way (Cox et al., 1958, J. Polymer Science 28, 619).

The LDPE material of the invention, beside realizing the higher density and higher melting temperature in DSC along with a comparatively high MI (190/2.16), allows in particular of using it in blow moulding applications, especially in BFS applications. Blow mouldings, in particular sealed bottles or ampoules, most preferably bottles or ampoules of from 0.001 L to 10 L volume, made from or comprising the LDPE of the present invention are a further object of the present invention. Likewise, a novel, ingenious process allowing for the first time of devising such novel LDPE polymer has been devised, being a further object of this invention. —The LDPE of the present invention further excels by its excellent E-module characteristic, which besides the material's reduced tendency to soften upon heating, is material for avoiding leakage of sealed bottles upon sterilization and changing pressurization of the autoclaves vessels used therefore. Moreover, it allows of easier processing in blow moulding applications due to an decreased zero shear complex viscosity $\eta_0$ as compared to comparable prior art materials of even lower density. The new LDPE material further preserves or even gradually improves the acceptable swell ratio of comparable prior art materials, relevant to blow moulding applications.

According to a further object of the invention, it is claimed a process for manufacturing the LDPE or LDPEs according to the present invention, characterized in that it comprises the steps of conducting high-pressure polymerization of ethylene by I. adding to a tubular reactor having at least three consecutive reactor zones as defined by the number of reagent inlets available, preferably to a tubular reactor having just three reactor zones, at a first inlet for the first reactor zone a peroxide mixture comprising at least one first peroxide having a half-time of decay of <0.1 hr at 105° C. and further comprising at least one second peroxide having a half-time of decay of >0.1 hr at 105° C.

II. adding to said reactor at a second inlet, and at any further inlet available, a peroxide mixture consisting essentially of at least one second peroxide having a half-time of decay of >0.1 hr at 105° C. in chlorobenzene, which may be the same or different from the second peroxide used in step I.), III. harvesting the polyethylene product from the reactor.

The half time of decay is determined in mono-chlorobenzene according to the generally acknowledged 'heat accumulation storage test' as indicated in the 'United Nations' recommendations on transport of dangerous goods', Manual of Tests and Criteria, New York and Geneva. From the above, it is understood that the terms 'first peroxide', 'second peroxide' pertain to generic classes of peroxides complying with the respective half-time of decay definition for each such class, given above.

More preferably, the above process being understood with the proviso that all said peroxide initiators used both first and second ones, have a half-life temperature at 1 min. of from 80° C. to 160° C. The skilled person in the art will often refer to half-life temperature as simply to 'Half-Life' which is the temperature at which half of the peroxide will decompose in a specified amount of time, that is in 1 minute time precisely in the present context. Routinely, the prior art may refer to Half-Life also as commonly referring to a basis period of 10 hours or 1 hour; in the present context though, Half-Life is understood as referring to a reference period of 1 minute. Typically, half-life of peroxides is reported in an Arrhenius-semi log plot vs. temperature.

Tubular reactor operation for radical polymerization of ethylene is known. A suitable, comprehensive description in particular for design and operation of tubular reactors may be found e.g. in WO 01/60875 and Ullmans Encylopaedie der technischen Chemie, Verlag Chemie GmbH, Weinheim/Germany, Band 19 (1980), p. 169-178, all of which is incorporated herewith by reference. It is particular preferred that a tubular reactor according to the present invention has the design as given and preferred in said WO 01/60875. After onset, the polymerization is highly exothermic, hence stringent control of maximum or peak temperature is required. Inside reactor profile may be relevant, as described in WO 05/065818. Initiator is dosed repeatedly along the tubular reactor length, at different inlet designating different reaction zone over the length of the reactor tube. Peroxide initiator is usually dosed in the range of from 0.5 to 100 ppm (per weight). Prior to injection of highly comprimated gaseous ethylene into the reactor space, it is important to prevent premature, mass balance triggered polymerization of the ethylene and comonomer where present, at the compression stage. It is therefore possible and preferred, to add stabilizers, otherwise called inhibitors such as sterically hindered amines or mixtures thereof, to the monomer gas as described e.g. in DE-196 22 441 and in WO 01/60875 in particular, preferably in amounts of <50 ppm. Inhibitors may accordingly be dosed as solution in organic, aliphatic solvent such as isodecane, at the compression stage prior to the reactor stage. It is also possible though to use other stable radicals, such as NO or $O_2$. Especially with oxygen, lower concentrations of <10 ppm oxygen, preferably of <5 ppm oxygen may suffice for allowing of a sufficient inhibitory effect at the compression stage, at temperatures of below 170° C., without becoming a separate initiator molecule in a dose triggered fashion at the higher temperatures prevailing in the reactor space. Initiation by oxygen would require higher oxygen concentration of at least 20 ppm in the reactor space; according to the present invention, it is strongly preferred to have no or at least <10 ppm oxygen in the tubular reactor or reactor space during polymerisation. Such an operational mode of the polymerization process is described in U.S. Pat. No. 5,100,978, incorporated herewith by reference, including sharp rise and drop of reactor temperature in between injection nozzles for designating. The minimum temperature to start the polymerization reaction is of form 125° C. to 170° C., preferably is set to range of from 135° C. to 150° C. Concomitantly, it is important to control the reactor temperature during exothermic polymerization as to stay <230° C., in the present context. According to the present invention, it is further preferred to use a chain transfer reagent during polymerisation, for controlling the average chain length of the polyethylene. The terms chain transfer and mass transfer reagent are used synonymously hereafter, for the purposes of the invention. As with any initiator compound, such mass transfer reagent is involved in onset of radical polymerization, being incorporated into product. Suitable mass transfer reagents may be e.g. dialylketones, alkanale or alkanes. Examples are MEK (methylethyl-ketone), propanal-1 or isopropane. Preferably, such mass transfer or chain transfer reagent is selected from the group consisting of C3 to C10 aldehyde or C3 to C10 alkane, more preferably from C3 to C10 aldehyde and/or C3 to C10 branched alkane. Most preferably, propanal-1 is used. The notion of 'LDPE homopolymer', in the context of the present invention and according to a particularly preferred embodiment for the product of the present invention, correspondingly defines such polyethylene low density homopolymer as to include only trace impurities of other olefins known to be routinely present in industrially produced ethylene. Accordingly, the LDPE homopolymer of the invention is devoid of the presence of olefinic comonomers >0.5% (w/w) by weight, based on the total weight of the LDPE, more preferably >0.1% (w/w), said amounts going beyond normal olefinic trace impurities usually carried along by ethylene delivered from industrial crackers. The presence or absence of such impurities may be determined by C-13 NMR analysis, as is routinely known to the skilled person. The term 'LDPE homopolymer' is inclusive, in contrast, to the presence of integral, molecular moieties in the final polymer product stemming from initiator and/or mass transfer reagents. Similar considerations applies to incorporation of oxygen, both when being used deliberately as an initiator and where possibly present only in trace amounts, i.e. when used mainly, in a dose-controlled fashion, but as an inhibitor, as said above.

Further, it is possible that the solvent used for solubilizing initiators functions as a mass transfer reagent during polymerisation. However, any such mass transfer reagent, especially alkanes not being distinguishable from comonomer per se once incorporated into product, present in the reactor is preferably dosed in the amount of <100 ppm, more preferably of <50 ppm, most preferably of <15 ppm, and hence may not compromise the above given preferred threshold level for comonomer-derived or comonomer-like impurities in the final product.

The time consuming sterilization procedure for PE-blow fill seal packagings is in fact the rate limiting step in production. The increases in the present LDPE material's melting and softening temperature alone translates into a huge 60% reduction from 150 min. down to 49 min. sterilization time for BFS articles such as e.g. infusion bottles as exemplified in FIG. 4. Further advantages are increased sterilization confidence, improved embossing of such BFS articles, and further reduction of energy and weight by allowing of reduced wall thickness of BFS articles made.

EXPERIMENTAL SECTION

GPC-MALLS measurements for determining Mw were carried out on a Polymer Laboratories PL-GPC C210 instrument according to ISO16014-1,2,4:2003 on high temperature GPC of Polyethylene under the following conditions: styrene-divinylbenzene column, 1,2,4-trichlorobenzene (TCB) as solvent, flow rate of 0.6 ml/min., at 135° C., with detection by multi-angle-laser light-scattering (MALLS) detector. Polyethylene (PE) solutions with concentrations of 1 to 5 mg/10 mL, depending on samples, were prepared at 150° C. for 2-4 h before being transferred to the SEC injection vials sitting in a carousel heated at 135° C. The polymer concentration was determined with infrared detection by a PolymerChar IR4 detector and the light scattering was measured with a Wyatt Dawn EOS multi angle MALLS detector (Wyatt Technology, Santa Barbara, Calif.). A laser source of 120 mW of wavelength 658 nm was used. The specific index of refraction was taken as 0.104 ml/g. Data evaluation was done with Wyatt ASTRA 4.7.3 and CORONA 1.4 software.

The molar mass distribution width (MWD) or polydispersity is defined as Mw/Mn. Definition of Mw, Mn, Mz, MWD can be found in the 'Handbook of PE', ed. A. Peacock, p. 7-10, Marcel Dekker Inc., New York/Basel 2000. The determination of Mn and Mw/Mn as calculated therefrom (and from Mw as obtained by different light scattering GPC method described above) was carried out by high-temperature gel permeation chromatography using a method essentially described in DIN 55672-1:1995-02 (issue February 1995). The modifications when working said DIN standard are as follows: Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB.

A WATERS Alliance 2000 equipped with the following precolumn SHODEX UT-G and separation columns SHODEX UT 806 M (3x) and SHODEX UT 807 connected in series was used. The solvent was vacuum distilled under Nitrogen and was stabilized with 0.025% by weight of 2,6-di-tert-butyl-4-methylphenol. The flowrate used was 1 ml/min, the injection was 500 µl and polymer concentration was in the range of 0.01%<conc.<0.05% w/w. The molecular weight calibration was established by using monodisperse polystyrene (PS) standards from Polymer Laboratories (now Varian, Inc., Essex Road, Church Stretton, Shropshire, SY6 6AX, UK) in the range from 580 g/mol up to 11600000 g/mol and additionally Hexadecane. The calibration curve was then adapted to Polyethylene (PE) by means of the Universal Calibration method (Benoit H., Rempp P. and Grubisic Z., in J. Polymer Sci., Phys. Ed., 5, 753 (1967)). The Mark-Houwing parameters used herefore were for PS: kPS=0.000121 dl/g, αPS=0.706 and for PE kPE=0.000406 dl/g, αPE=0.725, valid in TCB at 135° C. Data recording, calibration and calculation was carried out using NTGPC_Control_V6.02.03 and NTGPC_V6.4.24 (HS-Entwicklungsgesellschaft für wissenschaftliche Hard-und Software mbH, Hauptstraße 36, D-55437 Ober-Hilbersheim) respectively. Further with relevance to smooth, convenient extrusion processing at low pressure, preferably the amount of the polyethylene of the invention with a molar mass of <1 Mio. g/mol, as determined by GPC for standard determination of the molecular weight distribution, is preferably above 95.5% by weight. This is determined in the usual course of the molar mass distribution measurement by applying the WIN-GPC' software of the company 'HS-Entwicklungsgesellschaft für wissenschaftliche Hard-und Software mbH', Ober-Hilbersheim/Germany, see above.

Die swell (swell ratio) was determined according to ISO 11443-1995, cp. section 7.8 on 'measurement of extrudate swelling'

The tensile E-modulus was measured in accordance with ISO 527-1 and -2 (rod of type 1A, 1 mm/min and secant modulus of from 0.05% to 0.25% elongation) on a compression-moulded sample plate, obtained according to ISO 1872-2 from LDPE granulate as harvested from the reactor).

Density was determined according to ISO 1183.

Vicat temperature was determined using the ISO 306:2004, method A50.

Melt flow rate (MI) was determined according to ISO 1133-2005 at a temperature of 190° C. and at a load of 2.16 kg (MI) or 21.6 kg (HLMI), as indicated.

DSC was carried out for determining melting point temperature Tm (i.e. $2^{nd}$ heat of melting, Tm2). The melting enthalpies of the polymers ($\Delta$Hf) were measured by Differential Scanning Calorimetry (DSC) on a heat flow DSC (TA-Instruments Q2000), according to the standard method (ISO 11357-3 (1999)). The sample holder, an aluminum pan, is loaded with 5 to 6 mg of the specimen and sealed. The sample is then heated from ambient temperature to 200° C. with a heating rate of 20 K/min (first heating). After a holding time of 5 minutes at 200° C., which allows complete melting of the crystallites, the sample is cooled to −10° C. with a cooling rate of 20 K/min and held there for 2 minutes. Finally the sample is heated from −10° C. to 200° C. with a heating rate of 20 K/min (second heating). After construction of a baseline the area under the peak of the second heating run is measured and the enthalpy of fusion ($\Delta$Hf) in J/g is calculated according to the corresponding ISO (11357-3 (1999)).

Dynamic viscosity measurement is carried out for determining complex viscosity $\eta^*$. Measurement is made by dynamic (sinusoidal) deformation of the polymer blend in a double-plate rheometer such as such as Anton-Paar MCR 300 (Anton Paar GmbH, Graz/Austria). Firstly, the sample (in granulate or powder form) is prepared for the measurement as follows: 2.2 g of the material are weighted and used to fill a moulding plate of 70×40×1 mm. The plate is placed in a press and heated up to 200° C., for 1 min. under a pressure of 20-30 bar. After the temperature of 200° C. is reached, the sample is pressed at 100 bar for 4 min. After the end of the press-time, the material is cooled to room temperature and plates are removed from the form. A visual quality control test is performed at the pressed-plates, for possible cracks, impurities or inhomogeneity. The 25 mm diameter, 0.8-1 mm thick polymer discs are cut off from the pressed form and introduced in the rheometer for the dynamic mechanical analysis (or frequency sweep) measurement.

The measurement of the elastic (G') and viscous (G") moduli and the complex viscosity $\eta^*$ as a function of frequency is performed in an Anton Paar MCR300 stress-controlled rotational rheometer, as said before. The device is equipped with a plate-plate geometry, i.e. two parallel discs of 24.975 mm radius each with a standard gap of 1.000 mm between them. For this gap ~0.5 ml of sample is loaded and heated at the measurement temperature (standard for PE: T=190° C.). The molten sample is kept at the test temperature for 5 min. to achieve a homogeneous melting. Thereafter the frequency sweep begins by the instrument taking points between 0.01 and 628 rad/s logarithmically.

A periodic deformation in the linear range with a strain amplitude of 0.05 (or 5%) is applied. The frequency is varied, starting from 628.3 rad/s (or $\phi$100 Hz) to 8.55 rad/s and for the very low frequency regime continuing from 4.631 rad/s to 0.01 rad/s (or 0.00159 Hz) with an increased rate of sampling, such as that more points are taken for the low frequency range. The resulting shear stress amplitude and the phase lag from the applied deformation are acquired and used to calculate the moduli and the complex viscosity, as a function of frequency.

Points are chosen from the frequency range logarithmically descending from high frequencies to low and the result at each frequency point is displayed after at least 2-3 oscillations with a stable measured value are acquired.

Generic Description of the Polymerization Process

The present invention relates to the production of low density polyethylene LDPE with a low melt flow index. The product is synthesized via the high pressure ethylene polymerisation process in a tubular reactor, known as proprietary Lupotech TS™ process, using propionaldehyde as a chain transfer agent, and peroxides cocktails as free radical initiators. The reactor was water-jacketed, for allowing of temperature control, especially peak temperature control in the different reactor zones. The tubular reactor used for the different examples has the following characteristics:

Three reactor zones (length of each: 387 m-413 m-232 m)
Total length of the reactor: 1032 m
Internal diameter of the pipe: 40 mm
Tubular reactor residence time: 75 s
all gas coming from the gas feed compressor enters at the front of the preheater/reactor
The reactor is monitored by thermocouples installed in regular intervals alongside the tubular reactor.

Different peroxide cocktails, diluted in isododecane (IDD), are prepared and fed at the inlet of each reactor zone.

Taking into account the relative position of inlet and the maximal temperature in each zone, the peroxides selected used are listed here (Trigonox™ brand, source: AkzoNobel, Amersfoort/The Netherlands):

TBPND: tert.Butyl-peroxy-neodecanoate, 75% pure in aliphatic hydrocarbon solvent, CAS No. 26748-41-4
TBPPI: tert.Butyl-peroxypivalate, 25% pure in aliphatic hydrocarbon solvent, CAS No. 927-07-1
TBPEH: tert.Butyl-peroxy-2-ethylhexanoate, 70% pure in aliphatic hydrocarbon solvent, CAS No. 3006-82-4
TBPIN: tert.Butyl-peroxy-3,5,5-trimethylhexanoate, 30% pure in aliphatic hydrocarbon solvent, CAS No. 13122-18-4

To limit the fouling of the reactor, the reactor pressure is lowered at regular intervals, regulated by the let down valve. Subsequent to passing through the last reactor zone, the mixture of polyethylene and non-converted, gaseous ethylene is both discharged and expanded through the let down valve at the end of the reactor tube, which reduces the pressure level to the heat exchanger inlet pressure of closer to 300 bar. Concomitantly with passing through the let down valve, due to the Joule Thomson effect, the temperature of the mixture decreases of several decades, depending on the reactor pressure, reactor outlet temperature and specific polymer grades produced.

After the let down valve, the mixture is then first cooled in the heat exchanger, called aftercooler, before entering the high pressure product separator (HPPS), where the polymer melt is separated from the non reacted ethylene. The normal pressure of the HPPS is around 300 bar. At this stage, the non reacted ethylene is split off and is preferably used for feeding a high pressure recycle circuit including additional purification steps. —The melt product retained in the HPPS, containing always dissolved/occluded ethylene, is expanded another time to the low pressure separator (LPPS) inlet pressure where it is freed from said residual ethylene. The pressure of the LPPS is ranging between 0.5 to 4 bar, normally it is kept between 0.5 to 2.5 bar. The melt product outlet of the LPPS is directly connected to the extruder inlet through a slide valve. The extruder for discharge of the final polymeric LDPE material, is a Pomini single screw, with a rear degassing. Its die plate is heated with high pressure steam. The LDPE granulate thus produced was submitted to chemical and mechanical testing, as described in the sections below. —A typical temperature profile for operation of the reactor for the present invention is shown in FIG. 1. Note that the temperature probes are evenly distributed over the entire length of the above described reactor, hence correspond to the distance from reactor inlet/gas feed compressor discharge. The comparative example is a Lupolen 3220 F (commercially available from Basell Polyolefine GmbH, Germany, of density 0.930 g/cm3 and MI2.16 kg=0.77) high pressure LDPE, i.e. obtained by radical polymerisation. It is used as a comparative example in all FIG. 1-4.

Example 1

The polymerization was run as generically described above, with the following particularities:
Reactor pressure at the gas feed compressor discharge: 3055 bar
Preheater outlet temperature=139° C.
Propionaldehyde flow rate=20 l/h
Maximum temperature in each zone: 225° C./235° C./235° C.
The composition of the peroxides cocktails for each of the three zones is given in table I hereafter:

TABLE I

|  | Zone [kg/h] | Zone [kg/h] | Zone [kg/h] |
|---|---|---|---|
| IDD | 9.78 | 7.14 | 8.09 |
| TBPND | 0.41 |  |  |
| TBPPI | 0.21 |  |  |
| TBPEH | 0.55 | 0.21 | 0.24 |
| TBPIN | 0.055 | 0.145 | 0.164 |
| Summe | 11 | 7.5 | 8.5 |

Taking into account the temperature at the inlet of zones 2 and 3, the TBPND and the TBPPI are not necessary. The product thus obtained was characterised as follows:
Density: 933.6 kg/m$^3$
MI: 0.94 g/10 min (190° C./2.16 kg)
Production rate=5.4 T/h, amounting to about 18% conversion rate
Mw (weight average molecular weight)=123 061 g/mol
Mn (number average molecular weight)=12 340 g/mol
Melting temperature: 119° C.
E-modulus: 487 MPa
Swell ratio: 82%

Example 2

The polymerization was run again as generically described above in the preamble to the experiments, again with the following modifications:
Reactor pressure at the gas feed compressor discharge: 3055 bar
Preheater outlet temperature=139° C.
Propionaldehyde flow rate=18 l/h
Maximum temperature in each zone: 212° C./225° C./222° C.
The composition of the peroxides cocktails for the three zones is given in table II hereafter:

TABLE II

|  | Zone 1 [kg/h] | Zone 2 [kg/h] | Zone 3 [kg/h] |
|---|---|---|---|
| IDD | 8.85 | 6.49 | 8.34 |
| TBPND | 0.43 |  |  |
| TBPPI | 0.29 |  |  |
| TBPEH | 0.43 | 0.47 | 0.6 |
| TBPIN |  | 0.047 | 0.06 |
| Summe | 10 | 7.0 | 9.0 |

Taking into account the low $T_{max}$ in zone 1, there is not more interest to use TBPIN. And as before in example 1, taking into account the temperature at the inlet of zones 2 and 3, the TBPND and the TBPPI are not necessary. The product thus obtained was characterised as follows:
Density: 934.5 kg/m$^3$
MI: 0.94 g/10 min. (190° C./2.16 kg)
Production rate=5.1 T/h, amounting to 17% conversion rate
Mw (weight average molecular weight)=99 365 g/mol
Mn (number average molecular weight)=17 959 g/mol
Melting temperature: 120° C.
E-modulus: 525 MPa
Swell ratio: 80%

Figure 2:
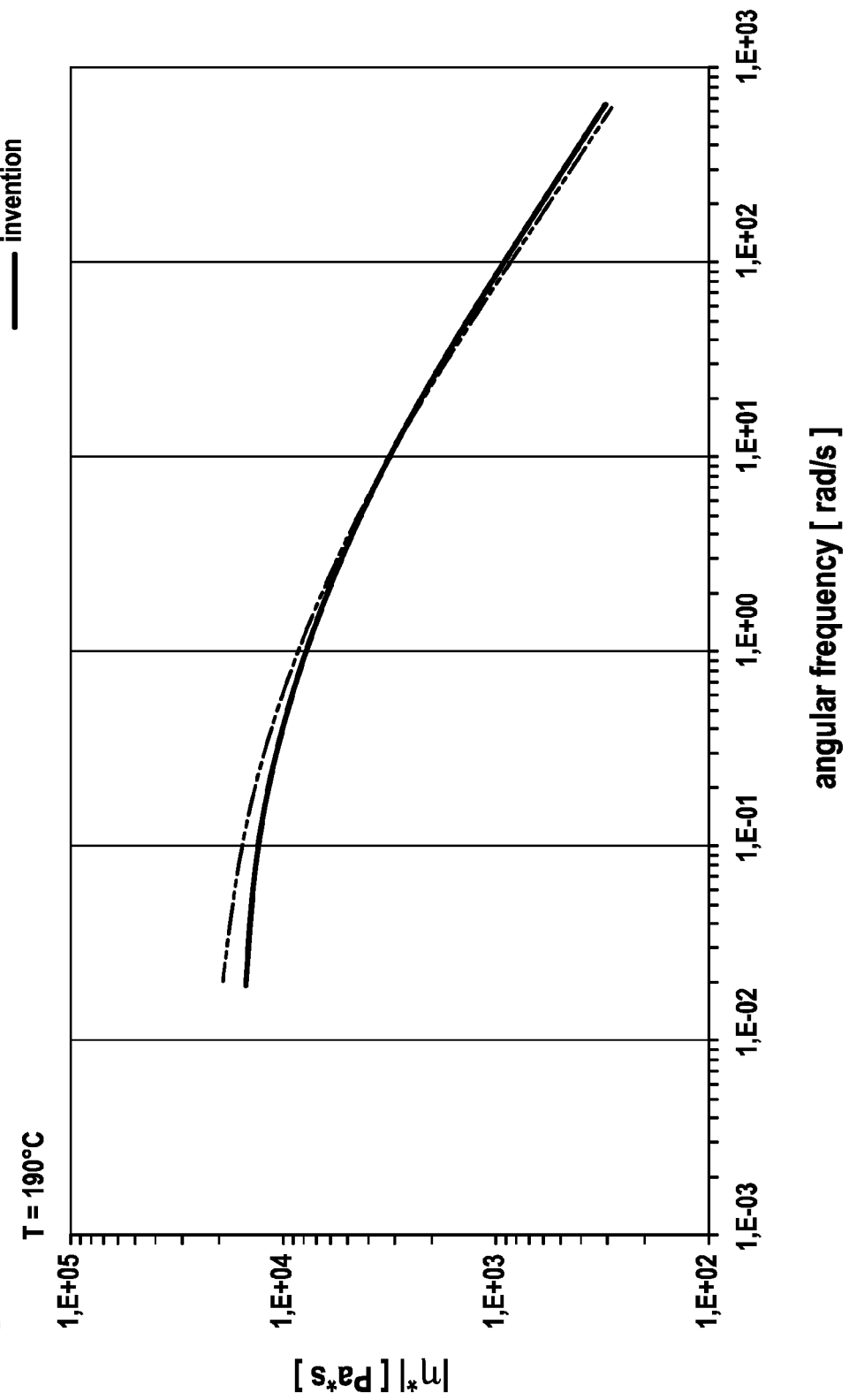
FIG. 2 illustrates dynamic viscosity of an LDPE at low shear rates.
Figure 3:
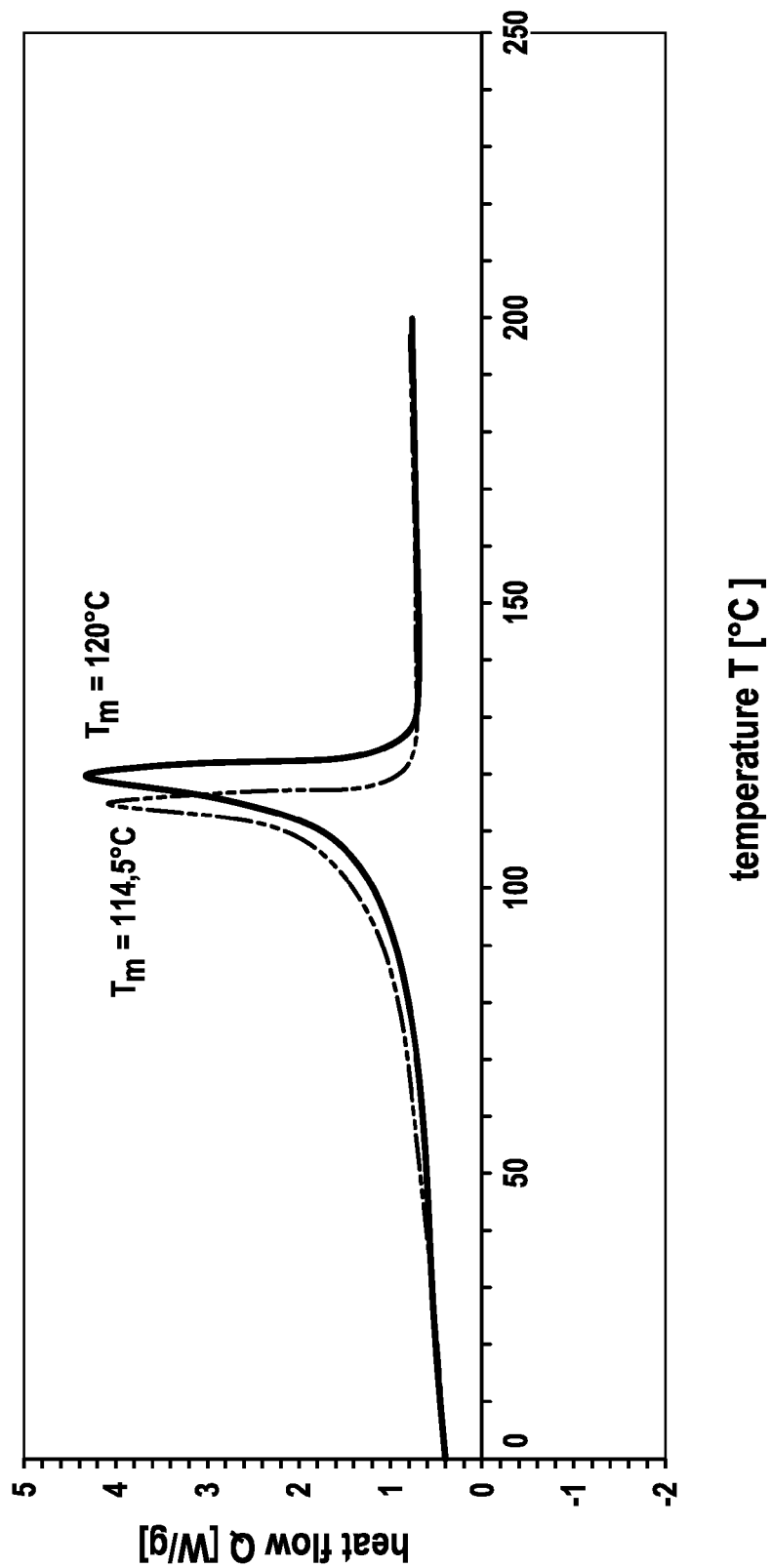
FIG. 3 illustrates caloric data obtained using a Differential Scanning Calorimeter for an LDPE.

The GPC, the rheological data and the DSC, respectively, are given in FIGS. 2 & 3 for both the product of examples 1 and 2, as compared to an existing lower density product from prior art (commercialised by present applicant, Lupolen 3220 D). FIG. 2 describes dynamic viscosity at different low shear rates. FIG. 3 displays caloric data from DSC.

Example 3

The polymerization was run again as generically described above in the preamble to the experiments, again with the following modifications:
Reactor pressure at the gas feed compressor discharge: 3055 bar
Preheater outlet temperature=139° C.
Propionaldehyde flow rate=16 l/h
Maximum temperature in each zone: 216° C./220° C./220° C.
The composition of the peroxides cocktails for the three zones is given in table III hereafter:

TABLE III

|  | Zone 1 [kg/h] | Zone 2 [kg/h] | Zone 3 [kg/h] |
|---|---|---|---|
| IDD | 10.25 | 9.01 | 9.01 |
| TBPND | 0.48 |  |  |
| TBPPI | 0.29 |  |  |
| TBPEH | 0.48 | 0.45 | 0.45 |
| TBPIN |  | 0.04 | 0.04 |
| Summe | 11.5 | 9.5 | 9.5 |

The ensuing product had the following characteristic:
Density: 933.5 kg/m$^3$
MI: 0.48 g/10 min (190° C./2.16 kg)
Production rate=5.1 T/h amounting to 17% conversion rate
Mw (weight average molecular weight)=107 248 g/mol
Mn (number average molecular weight)=23 618 g/mol
Melting temperature: 119° C.
E-modulus: 500 MPa
Swell ratio: 76%

Example 4

The polymerization was run again as generically described above in the preamble to the experiments, again with the following modifications:

Reactor pressure at the gas feed compressor discharge: 3120 bar
Preheater outlet temperature=139° C.
Propionaldehyde flow rate=16.5 l/h
Maximum temperature in each zone: 206° C./215° C./215° C.
The composition of the peroxides cocktails for the three zones is given in table IV hereafter:

TABLE IV

|       | Zone 1 [kg/h] | Zone 2 [kg/h] | Zone 3 [kg/h] |
|-------|---------------|---------------|---------------|
| IDD   | 7.97          | 11.87         | 10.45         |
| TBPND | 0.42          |               |               |
| TBPPI | 0.34          |               |               |
| TBPEH | 0.27          | 0.625         | 0.55          |
| TBPIN |               |               |               |
| Summe | 9             | 12.5          | 11            |

The ensuing product had the following characteristic:
Density: 934.3 kg/m$^3$
MI: 0.51/10 min. (190° C./2.16 kg)
Production rate=4.7 T/h amounting to 15.5% conversion rate
Mw (weight average molecular weight)=104 608 g/mol
Mn (number average molecular weight)=23 856 g/mol
Melting temperature: 120° C.
E-modulus: 519 MPa
Swell ratio: 75%

Examples 3 & 4 demonstrate that it possible to obtain similar melting temperatures, though with lower MI (hence less optimal processability) than in examples 1 and 2. According to the present invention, it is most preferred to have both, an increased melting temperature in combination a relatively high MI. —Even slight increases in intrinsic melting and softening temperature, respectively, have hugely decreasing effect on effective sterilization times and hence on operational cycling times, in continuous production. All exemplary materials according to the present invention having a DSC melting temperature of from 119 to 120° C. have a corresponding Vicat A or softening temperature of from 110 to 111° C. The time consuming sterilization procedure for PE-blow fill seal packagings is in fact the rate limiting step in production. As for the change in material's melting temperature alone, a change of from 110 (prior art) to at least 115° C. effective sterilization temperature, as feasible with the material of the present invention, translates into a huge reduction from 150 min. down to 49 min. sterilization time as exemplified in FIG. 4 (overkill condition, that is no single viable organism surviving—SAL=0%).

The invention claimed is:

1. A low density polyethylene (LDPE) obtained by radical polymerisation of ethylene, wherein the LDPE is a homopolymer, and has:
   (i) a density from 0.932 to 0.936 g/cm$^3$;
   (ii) a molecular weight distribution, Mw/Mn, from 3 to 10 or 6 to 15; and
   (iii) a melt flow rate, MI, (190° C./2.16 kg) from 0.45 to 1.5 g/10 min.

2. The LDPE according to claim 1, wherein a chain transfer agent comprising a $C_3$ to $C_{10}$ aldehyde is used during the radical polymerisation.

3. The LDPE according to claim 1, wherein the LDPE has a melting temperature from 118 to 122° C. in DSC measured according to ISO 11357-3 (1999).

4. The LDPE according to claim 1, wherein the LDPE has an E-modulus of at least 470 Mpa.

5. The LDPE according to claim 1, wherein the LDPE has an Mw of from 60,000 to 130,000 g/mol.

6. The LDPE according to claim 3, wherein the LDPE has one 2$^{nd}$ heat of melting peak temperature (Tm2) in a temperature range of from 118° C. to 122° C.

7. The LDPE according to claim 1, wherein the LDPE is a homopolymer which has been radically polymerized in the presence of a tert.-butylester of branched C4 to C15 alkanoic peracids, and propanal, and in the absence of an amount of oxygen effective for making oxygen an initiator.

8. A process for a low density polyethylene (LDPE) by high-pressure polymerization of ethylene, the process comprising:
   i.) adding to a tubular reactor having at least two consecutive reactor zones as defined by the number of reagent inlets available, at the first inlet for the first reactor zone a peroxide mixture comprising at least one first peroxide having a half-time of decay of <0.1 hr at 105° C. in chlorobenzene and further comprising at least one second peroxide having a half-time of decay of >0.1 hr at 105° C. in chlorobenzene,
   ii.) adding to said reactor at the second inlet, and at any further inlet available, a peroxide mixture consisting essentially of at least one second peroxide having a half-time of decay of >0.1 hr at 105° C. in chlorobenzene, which may be the same or different from the second peroxide used in step i.), and
   iii.) harvesting the polyethylene product from the reactor wherein the polyethylene product from the reactor is a low density polyethylene (LDPE), wherein the LDPE is a homopolymer and has:
   (i) a density of at least from 0.932 to 0.936 g/cm$^3$;
   (ii) a molecular weight distribution, Mw/Mn, of from 3 to 10 or of from 6 to 15; and
   (iii) has an melt flow rate, MI, (190° C./2.16 kg) from 0.45 to 1.5 g/10 min.

9. The process according to claim 8, wherein the second peroxide in step i.) amounts to 50% or less of the total amount of peroxide added at the first inlet.

10. The process according to claim 8, wherein at least one of the first and second peroxides are tertiary- or secondary-C3 to C10-alkylester of branched or unbranched C4 to C15-alkanoic peracids wherein the acids may optionally bear halogens selected from F or Cl in the alkyl moiety.

11. The process according to claim 8, wherein the maximal reactor temperature is controlled in each reactor zone to <230° C.

12. The process according to claim 8, further comprising that a chain transfer agent is used during radical polymerisation, the chain transfer agent being selected from the group consisting of C3 to C10 aldehyde, ketone and branched alkane.

13. A process comprising manufacturing a moulded article comprising the LDPE of claim 1.

14. The process of claim 13 wherein the moulded article is selected from a bottle, can or ampoule.

15. The process of claim 13, wherein the article further comprises a sterile liquid for medical use.

16. The LDPE of claim 1 wherein the LDPE density is 0.933 to 0.935 g/cm$^3$.

17. The LDPE of claim 1 wherein the MI is 0.80 to 1.25 g/10 min.

18. The LDPE of claim 17 wherein the LDPE MI is 0.90 to 1.25 g/10 min.

19. The LDPE of claim 2 wherein the chain transfer agent is propanal.

20. The LDPE of claim 4 wherein the E-modulus is at least 500 MPa.

21. The LDPE of claim 5 wherein the Mw is from 80,000 to 120,000 g/mol.

22. The process of claim 8 wherein the tubular reactor has three reactor zones.

23. The process of claim 8 wherein the first and second initiators have a half-life temperature at 1 min. of from 80° C. to 160° C.

24. The process of claim 10 wherein the at least one of the first and second peroxide are a tert butylester of branched C4 to C15 alkanoic peracids.

25. The process of claim 11 wherein the reactor pressure is greater than 2600 bar.

26. The process of claim 25 wherein the reactor pressure is 2700 to 3200 bar.

27. The process of claim 26 wherein the reactor pressure is from 2900 to 3100 bar.

28. The process of claim 14 wherein the moulded article is a sealed bottle or ampoule having a volume of from 0.001 L to 10 L.

29. The process of claim 13 wherein the process is a blow-fill seal blow moulding process.

* * * * *